(12) United States Patent
Schwarz

(10) Patent No.: US 6,277,023 B1
(45) Date of Patent: Aug. 21, 2001

(54) MOTOR VEHICLE SEAT WITH VENTILATION DEVICE

(75) Inventor: Tobias Schwarz, Budenheim (DE)

(73) Assignee: Faurecia Autositz GmbH & Co. KG, Stadthagen (DE)

( * ) Notice: Subject to any disclaimer, the term of this patent is extended or adjusted under 35 U.S.C. 154(b) by 0 days.

(21) Appl. No.: 09/406,786

(22) Filed: Sep. 28, 1999

(30) Foreign Application Priority Data

Oct. 7, 1998 (DE) .............................................. 198 46 090

(51) Int. Cl.⁷ ....................................................... A47C 7/74
(52) U.S. Cl. ................ 454/120; 297/180.14; 297/452.47
(58) Field of Search ................ 454/120, 90; 297/180.14, 297/452.42, 452.46, 452.47

(56) References Cited

U.S. PATENT DOCUMENTS

| | | | |
|---|---|---|---|
| 2,055,843 | * | 9/1936 | Helfinstine ........................ 454/120 X |
| 2,430,335 | * | 11/1947 | Hart ...................................... 454/120 |
| 3,506,308 | * | 4/1970 | Fenton ............................. 297/452.47 |
| 4,685,727 | * | 8/1987 | Cremer et al. ................... 297/180.14 |
| 5,102,189 | * | 4/1992 | Saito et al. ........................ 454/120 X |

FOREIGN PATENT DOCUMENTS

| | | |
|---|---|---|
| 41 12 631 C1 | 4/1992 | (DE) . |
| 197 37 636 A1 | 3/1999 | (DE) . |
| 0 217 752 * | 4/1987 | (EP) ..................................... 454/120 |
| 97/09908 | 3/1997 | (WO) . |

* cited by examiner

*Primary Examiner*—Harold Joyce
(74) *Attorney, Agent, or Firm*—Connolly Bove Lodge & Hutz

(57) ABSTRACT

A motor vehicle seat with a ventilation device having an exhaust channel, the entrance of which connects to an air-permeable contact surface. A porous air-permeable mat is provided adjacent to the contact surface, and an exhaust fan is provided in the exhaust air channel. An intake channel terminates at the mat and has an intake opening. A total air current drawn in by the intake fan and exiting the exhaust channel includes an air current drawn in through the intake opening and an air current drawn in through the contact surface.

14 Claims, 3 Drawing Sheets

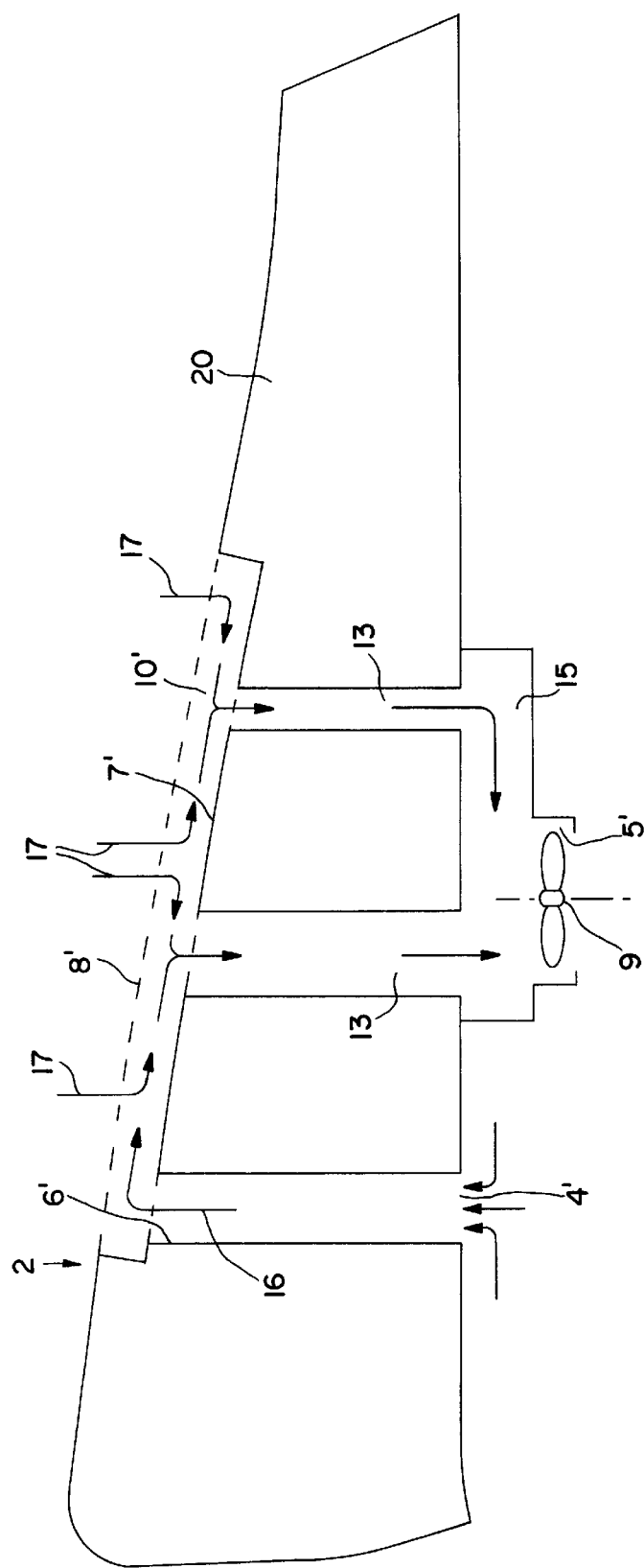

MOTOR VEHICLE SEAT WITH VENTILATION DEVICE

BACKGROUND OF THE INVENTION

The present invention pertains to a motor vehicle seat with a ventilating device having an exhaust channel whose entrance is connected with a contact surface of the seat which is air permeable.

In the case of a motor vehicle seat of this well-known type (see, for example, WO 97/09 908), the entire current of air that is transported is drawn off directly from a contact surface through a covering that is equipped with openings and a mat that is permeable to air. The mat is protected from the area of the seat that surrounds it in a manner that is impervious to air. The current of air that flows through the covering and the air-permeable mat should encounter as little resistance as possible. A current of air that results from the effects of suction is frequently perceived as being not so unpleasant as one that is generated as the result of being blown upon; however, in the area that lies immediately opposite the fan, in particular, high rates of flow result, which are perceived as an unpleasant draft. By contrast, little air is drawn off from the areas that surround the intake opening. Across the contact surface, therefore, the result is a widely varied and unfavorable distribution of the current.

Taking this state of the art into account, it is an objective of the present invention to create a motor vehicle seat with a ventilating device that provides a comfortable seating environment, without the above-described drawbacks.

SUMMARY OF THE INVENTION

The present invention is a ventilating device for a motor vehicle seat wherein the ventilating device comprises an exhaust channel having an entrance connected with an air permeable contact surface and a porous air permeable mat adjacent the contact surface and an intake fan disposed in the exhaust channel and an intake channel terminating at the mat and having an intake opening and wherein a total air current drawn in by the intake fan and exiting the exhaust channel comprises a first air current drawn through the intake opening and a second air current drawn through the contact surface.

As a result of drawing in a partial air current that originates from the area surrounding the seat, which is conducted, in the longitudinal direction, through at least one constituent area of the mat, a negative pressure results beneath the contact surface of this relatively large area, which draws off a partial current of air from this area of the contact surface. For that reason, only very low rates of flow result on the contact surface, which are virtually imperceptible by the user of the seat. The constituent air current, which is drawn in from the surroundings, also brings the contact surface to a comfortable temperature. Any moisture that may be present can also be drawn off with the total current of air.

In one preferred embodiment of the invention, the intake channel, by means of which ambient air can be drawn in, is provided on a backrest, with a sufficient distance above the area of the loins so that no more than a comparatively small quantity of air is withdrawn from the sensitive area of the loins. The particularly sensitive neck area can be protected from drafts of air in the same manner by selecting the arrangement of the fan, by means of which the air is drawn in, accordingly.

BRIEF DESCRIPTION OF THE DRAWINGS

FIG. 3 shows a schematic, longitudinal section through a second embodiment, with a ventilation device for the seat portion.

DETAILED DESCRIPTION OF THE PREFERRED EMBODIMENT(S)

Figures 1, 2:
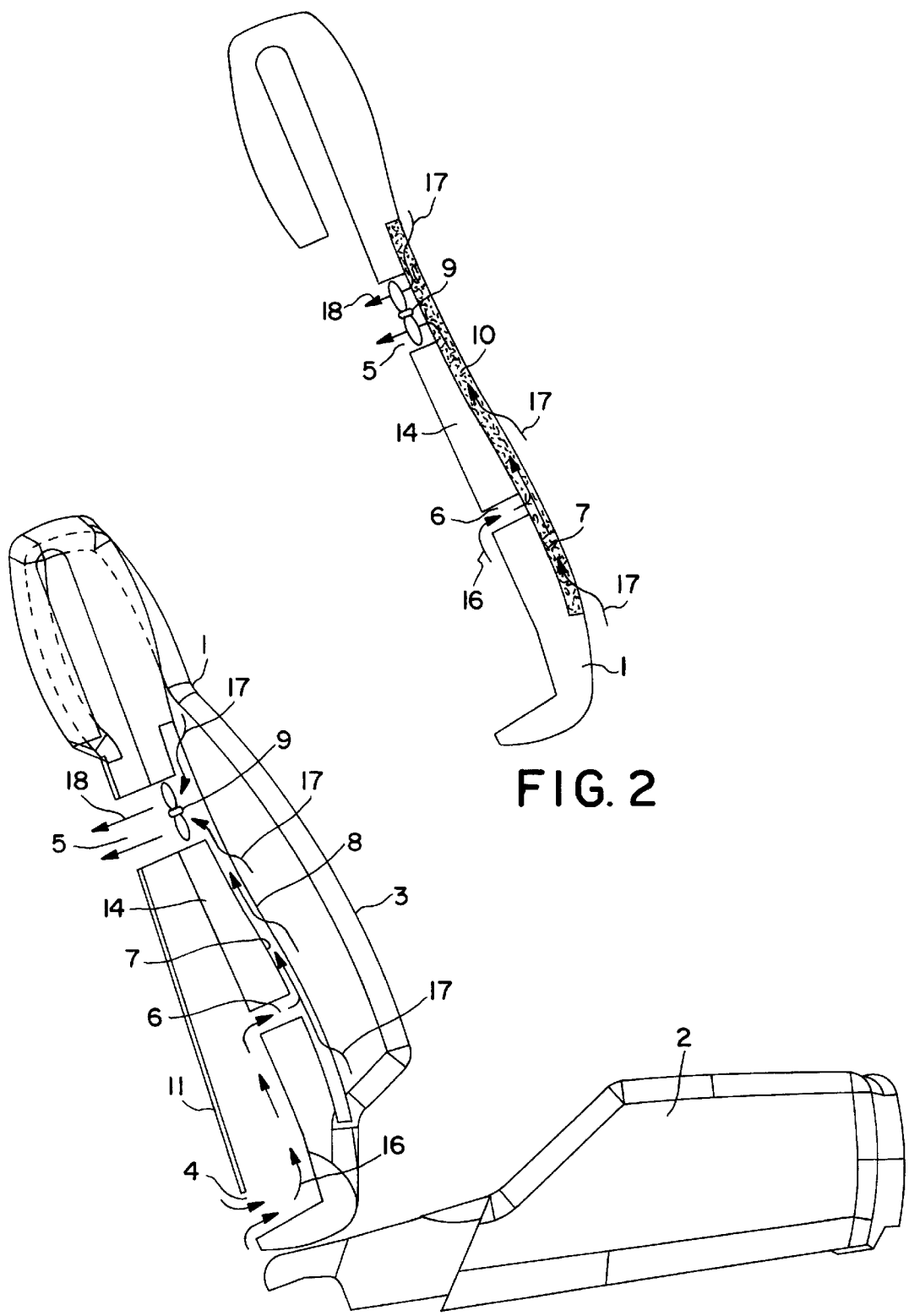
FIG. 1 shows a lateral view, in partial section, of an embodiment of the ventilation device on a backrest.
FIG. 2 shows a longitudinal section through the cushion of the backrest that corresponds to FIG. 1.

In the drawings, parts that are identical, or parts that correspond to one another, are given identical reference symbols, which are distinguished from one another, where necessary, by the addition of apostrophes. As shown in FIG. 1 a motor vehicle seat has a backrest 1 and a seat portion 2. Backrest 1 has a contact surface 8, against which the back of a person using the seat normally rests, which lies between lateral sides 3. The contact surface 8 is formed by means of a cushion cover that is air-permeable, and which covers a backrest cushion 14.

For the purpose of ventilating the backrest of the seat 1 behind the contact surface 8, a depression 7 is formed in the cushion of the backrest 14, into which a mat 10, which has pores and is air-permeable, is inserted. An intake fan 9 moves the air that has been drawn in to an exhaust channel 5, which is fed obliquely through a backrest cover 11 and the backrest cushion 14. At the lower end of the backrest cover 11, an intake opening 4 is formed, through which a first air current 16, which is indicated by arrows, is drawn in from the area surrounding the seat. Through the interstitial space between backrest cover 11 and backrest cushion 14, the first air current 16 travels into an intake channel 6, through which the first air current 16 travels to the air-permeable mat 10. In the mat 10, the first air current 16 joins with a second air current 17, which is drawn through the contact surface 8, to form a total air current 18, which is drawn off by the intake fan 9.

In mat 10, a negative pressure, which is a function of the volume of the air current that is introduced, is created. The quantity of air of the second air current 17, which penetrates to mat 10 through contact surface 8, depends upon the magnitude of this negative pressure. It can be determined by the size of the intake opening 4 or by the surface area of the cross-section of the exhaust channel 5.

Figure 4:
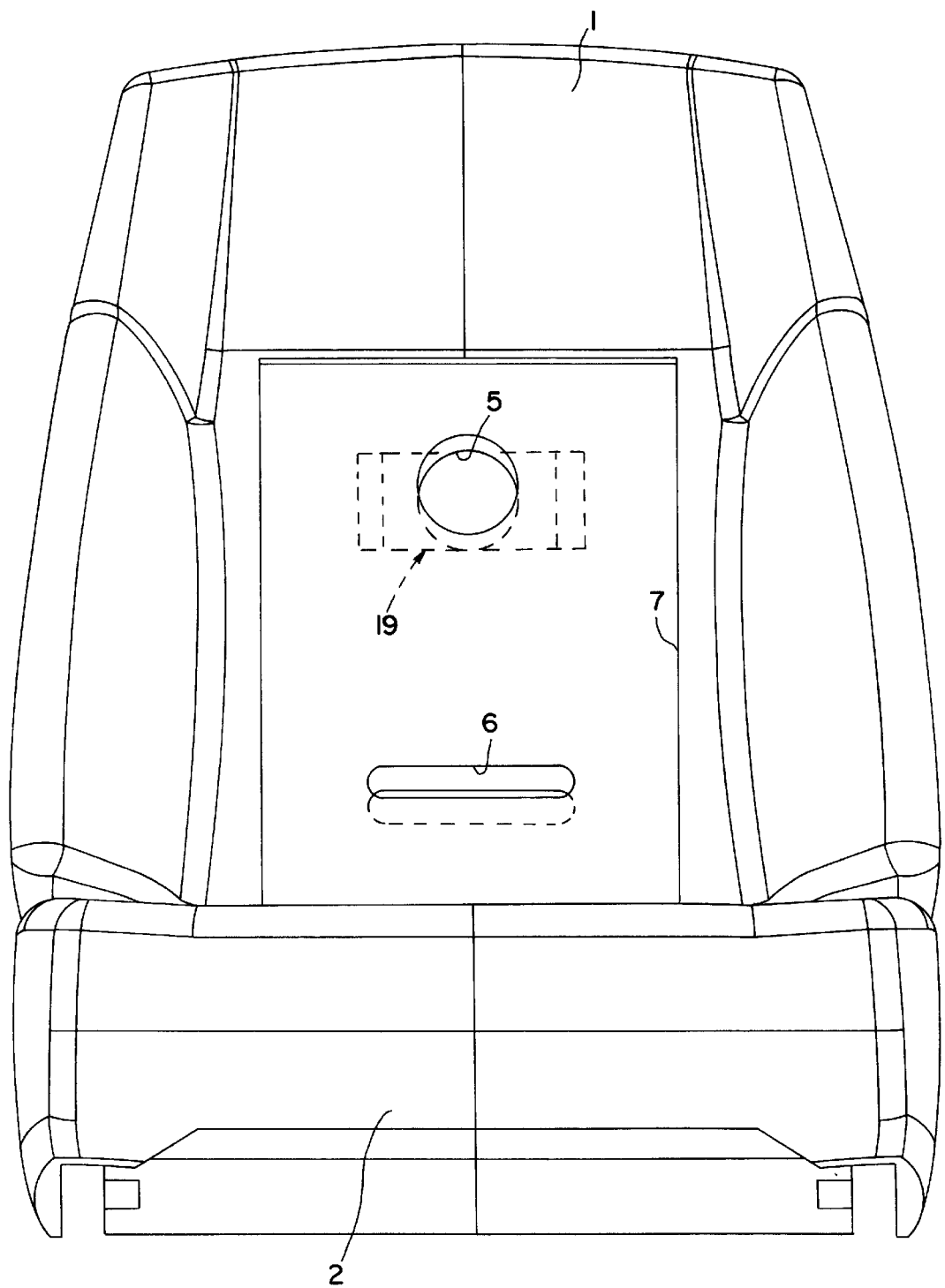
FIG. 4 shows a frontal view of the motor vehicle seat according to FIG. 1.

The air that is drawn in travels through the fine interstitial spaces of the air-permeable mat 10, and which is inlaid into the depression 7 of the seat cushion. The second air current 17 through the cushion cover and the first air current 16 through the additional intake channel 6 enter the mat 10 and are drawn off out of the mat 10 by means of the fan 9. The intake channel 6 may be embodied as a broad slit (FIG. 4). The exhaust channel 5 is covered over by a sliding device 19, with which the cross-section of its egress opening can be changed, and which steers the escaping total air current 18 in a direction that does not adversely affect the passengers who are sitting on the rear seats. The sliding device may include adjustable slats for steering the escaping total air current.

A second embodiment is shown in FIG. 3 for the seat portion 2 of a motor vehicle seat. In the front area of the seat portion 2, an intake channel 6' is provided, through which a first air current 16 is drawn in at an intake opening 4' beneath the motor vehicle seat. The additional intake channel 6' leads into a depression 7', which is filled up by the mat 10' and runs directly under the surface of the seat portion. A second air current 17 can penetrate into the mat 10' through an air-permeable contact surface 8'. The second current travels through exhaust air connection channels 13 to an intake chamber 15, from which it is transported away by the intake fan 9 under the seat portion 2. Several exhaust air connection channels 13 are required in the cushion 20 of the seat portion, so as not to weaken the cushion 20 of the seat portion, which is under a heavy burden, to an excessive degree, and so as not to exert an adverse influence upon the comfort of the cushioning.

We claim:

1. A motor vehicle seat with a ventilating device, comprising:

an air permeable contact surface of said seat;

a porous and air permeable mat arranged adjacent to said contact surface;

an intake channel within said seat having a free intake opening at one terminus and an output terminus connected to said mat;

an exhaust channel having an entrance connected with said mat and an output terminus; and a fan disposed within said exhaust channel generates a flow of air through said exhaust channel, wherein the total quantity of air that is drawn through said exhaust channel by said fan comprises:
   (i) a first air current drawn through said free intake opening and conveyed through said intake channel and said mat to said exhaust channel entrance, and
   (ii) a second air current drawn through said contact surface and conveyed through said mat to said exhaust channel entrance.

2. The motor vehicle seat of claim 1, wherein:

said fan is adjacent to said entrance of said exhaust channel.

3. The motor vehicle seat of claim 1, wherein said exhaust channel is adjacent an upper end of said mat.

4. The motor vehicle seat of claim 3, wherein said intake channel is adjacent a lower end of said mat below said exhaust channel.

5. The motor vehicle seat of claim 1, wherein said exhaust channel is directed toward the rear of a backrest of said seat.

6. The motor vehicle seat of claim 1, further comprising:

an exhaust channel cover attached to a backrest of said seat on a side opposite to that of said contact surface, wherein said cover directs the flow of air discharged from said exhaust channel away from an occupant seated behind said seat.

7. The motor vehicle seat of claim 1, wherein an egress area of said exhaust channel is adjustable.

8. The motor vehicle seat of claim 1, wherein said intake channel is above the lumbar spinal region of a seat user.

9. The motor vehicle seat of claim 1, wherein said intake opening is below said intake channel in the rear of a backrest of said seat.

10. The motor vehicle seat of claim 1, wherein said intake opening is on the underside of an intake channel directed obliquely through a seat portion of said seat.

11. The motor vehicle seat of claim 10, wherein said intake channel is in a front area of said seat portion.

12. The motor vehicle seat of claim 10, wherein a plurality of air connection channels, directed obliquely through said seat portion, channel air to a shared intake chamber.

13. The motor vehicle seat of claim 1, wherein a sliding device is provided at said exhaust channel for altering the surface area of the exit of said exhaust channel.

14. The motor vehicle seat of claim 13, wherein said sliding device includes adjustable slats for directing air flow.

* * * * *

UNITED STATES PATENT AND TRADEMARK OFFICE
CERTIFICATE OF CORRECTION

PATENT NO. : 6,277,023 B1
DATED : August 21, 2001
INVENTOR(S) : Tobias Schwarz

It is certified that error appears in the above-identified patent and that said Letters Patent is hereby corrected as shown below:

<u>Title page,</u>
Item [73], Assignee, should read:

-- Faurecia Autositze GmbH & Co. KG, Stadthagen (DE) --

Signed and Sealed this

Thirteenth Day of August, 2002

Attest:

Attesting Officer

JAMES E. ROGAN
*Director of the United States Patent and Trademark Office*